(12) United States Patent
Wu et al.

(10) Patent No.: US 6,373,733 B1
(45) Date of Patent: Apr. 16, 2002

(54) FIELD EFFECT TRANSISTOR CONTROLLED AC/DC POWER CONVERSION CIRCUIT

(76) Inventors: Jeng-Shyong Wu, No. 14, Alley 1, Lane 326, Shin-Pin Rd., Hsinchu; Ming-Tang Lee, 5F, No. 8, Alley 7, Lane 328, Chung shan road sec. 1, Yung Ho City, Taipei Hsien, both of (TW)

( * ) Notice: Subject to any disclaimer, the term of this patent is extended or adjusted under 35 U.S.C. 154(b) by 0 days.

(21) Appl. No.: 09/654,048

(22) Filed: Sep. 1, 2000

(30) Foreign Application Priority Data

Dec. 2, 1999 (CN) ...................... 99255422 U

(51) Int. Cl.[7] ............................................. H02M 7/06
(52) U.S. Cl. .......................... 363/89; 363/146
(58) Field of Search ................... 363/89, 146

(56) References Cited

U.S. PATENT DOCUMENTS

| | | | | |
|---|---|---|---|---|
| 3,331,013 A | * | 7/1967 | Cunningham | 363/146 |
| 5,126,652 A | * | 6/1992 | Carlin | 363/89 |
| 5,430,637 A | * | 7/1995 | Buck | 363/89 |
| 5,587,895 A | * | 12/1996 | Harkins | 363/89 |
| 5,777,868 A | * | 7/1998 | Gibboney et al. | 363/146 |
| 5,790,395 A | * | 8/1998 | Hagen | 363/89 |
| 5,801,933 A | * | 9/1998 | Ravid | 363/89 |
| 5,801,935 A | * | 9/1998 | Sugden et al. | 363/89 |
| 5,973,948 A | * | 10/1999 | Hahn et al. | 363/146 |
| 6,011,707 A | * | 1/2000 | Mine | 363/89 |
| 6,055,166 A | * | 4/2000 | Jacobs et al. | 363/89 |
| 6,061,259 A | * | 5/2000 | DeMichele | 363/89 |
| 6,069,470 A | * | 5/2000 | Feldkeller | 363/89 |
| 6,101,108 A | * | 8/2000 | Wittenbreder | 363/89 |
| 6,128,206 A | * | 10/2000 | Sun et al. | 363/89 |

* cited by examiner

Primary Examiner—Jeffrey Sterrett
(74) Attorney, Agent, or Firm—Troxell Law Office PLLC

(57) ABSTRACT

Disclosed herein is a FET controlled AC/DC power conversion circuit and application of same. The entire conversion circuit is constituted by a rectifier circuit, a switching circuit consisting of a FET, a controlling circuit, a monitor circuit, and a voltage stabilizing circuit, wherein output voltages of the rectifier circuit is respectively sent to the switching circuit and the controlling circuit, where switching time of the switching circuit is controlled by the controlling circuit thereby achieving control of output voltage to a load or loads.

4 Claims, 7 Drawing Sheets

FIELD EFFECT TRANSISTOR CONTROLLED AC/DC POWER CONVERSION CIRCUIT

BACKGROUND OF THE INVENTION

1. Field of the Invention

The present invention relates to a field effect transistor (FET) controlled AC/DC power conversion circuit and its application and more particularly, to an AC/DC power conversion circuit which can convert an AC power source of higher voltage into a DC power source of lower voltage and its application.

2. Description of the Prior Art

FIG. 1 is a view showing a conventional AC/DC high AC voltage to low DC voltage power conversion circuit. As shown in FIG. 1, an AC power source 100 is connected to a voltage transformation circuit 200, after the AC voltage is converted into a DC voltage, it is stabilized with a voltage stabilizer 300 for supplying to a DC load 400. In this scheme, the transformation circuit 200 may be either a simple circuit or a rather complicated circuit. With a simple circuit, the voltage is stepped down by an externally added power consuming element which produces high thermal loss, whereas in the case of utilizing a complicated circuit, the power conversion efficiency may be higher, but material cost is inevitably increased.

SUMMARY OF THE INVENTION

The present invention has been made to eliminate the above-described shortcomings inherent to the conventional techniques.

Accordingly, it is an object of the present invention to provide an AC/DC power conversion circuit in which an additional power consuming element is not required so as to eliminate causing an undesired power loss in voltage transformation.

It is another object of the present invention to provide an AC/DC power conversion circuit which is simple in construction so that the production cost can be reduced.

It is still another object of the present invention to provide an AC/DC power conversion circuits, which by virtue of its advantageous features of high efficiency and low heat loss, is applicable for driving small numbers of LEDs, and moreover, is suitable for applying this circuit mode to LED candle lights, chandeliers, night bulbs, flash lights, and the likes.

For fuller understanding of the nature, objects and advantages of the present invention, reference should be made to the following detailed description taken in conjunction with the following drawings.

DETAILED DESCRIPTION OF THE PREFERRED EMBODIMENTS

Figure 1:
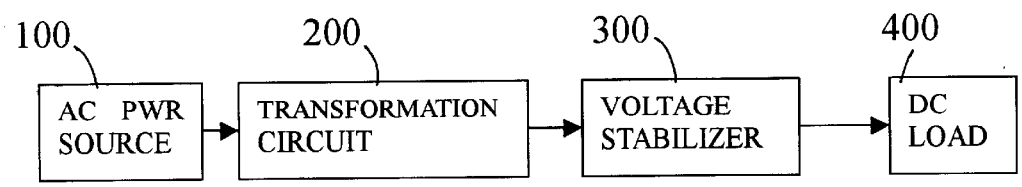
FIG. 1 is a view showing a conventional AC/DC high voltage to low voltage power conversion circuit.

FIG. 1 is a view showing a conventional AC/DC high voltage to low voltage power conversion circuit whose operational principle, nature and disadvantages have been described above so that it is not necessary to repeat herein below.

Figure 2:
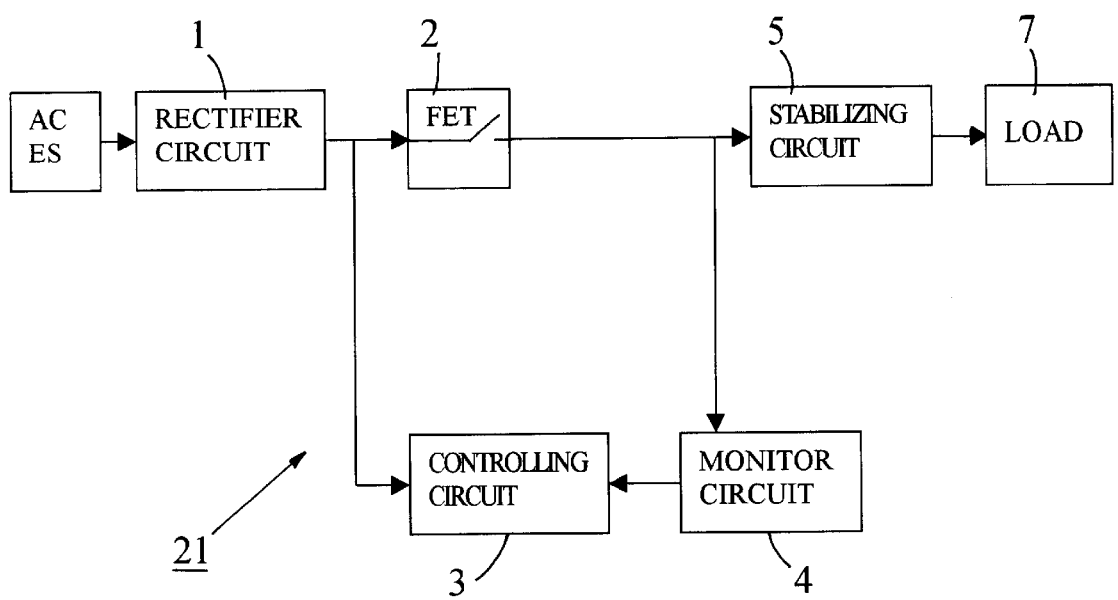
FIG. 2 is a basic block diagram for the present invention.

Referring to FIG. 2, the FET controlled AC/DC power conversion circuit of the present invention basically consists of a rectifier circuit 1, a switching circuit 2 composed of a FET, a controlling circuit 3, a monitor circuit 4, and a stabilizing circuit 5.

Operation of each component circuit is as follows:

1. Rectifier circuit: The duty of rectifier circuit 1 is to rectify an AC input into a DC output wherein the wave form of output voltage is shown in FIG. 2. This output will be sent to two specified circuits. One is the switching circuit 2 which is composed of a FET, from where the output voltage is applied to a load 7. The other [one] is the controlling circuit 3, wherein the output voltage is utilized as a reference signal for actuating the switching circuit 2.

2. Switching circuit: The duty of the switching circuit 2 is to control that output voltage of the rectifier circuit 1 to surely reach the stabilizing circuit 5 and then be supplied to the load 7. The operating time of the switching circuit 2 is entirely determined by the controlling circuit 3, through controlling operating time of the switch, the voltage output to the load 7 can be appropriately controlled.

3. Monitor circuit: The duty of the monitor circuit 4 is to monitor at every moment the output voltage of the switching circuit 2. When the output voltage of the switching circuit 2 rises as high as the prescribed value set by the monitor circuit 4, the monitor circuit 4 send a signal to the controlling circuit 3 informing the controlling circuit 3 to open the switching circuit 2 such that the input voltage of the switching circuit 2 can not be outputted to stabilizing circuit 5 to control the impressed voltage on the load 7.

4. Controlling circuit: The duty of controlling circuit 3 is to control switching action of the switching circuit 2. Its controlling action is based on two signals. When the output voltage of the rectifier circuit 1 is at a zero level, the controlling circuit 3 makes the switching circuit 2 close, at this time the output voltage of the rectifier circuit 1 reaches the stabilizing circuit 5 via the switching circuit 2, and then is impressed on the load 7. As the output voltage of the rectifier circuit 1 begins to rise, the controlling circuit 3 maintains the switching circuit 2 in a closed state so that the output voltage of the rectifier circuit 1 is still able to reach the stabilizing circuit 5 via the switching circuit 2, and then to the load 7. At the moment, when the voltage that the switching circuit 2 sends to the stabilizing circuit 5 rises as high as to the prescribed voltage level of the monitor circuit 4, the monitor circuit 4 sends a signal to the controlling circuit 3 such that the controlling circuit 3 opens the switching circuit 2, and the input voltage of the switching circuit 2 is no longer able to be sent to the stabilizing circuit 5. This state will be maintained until the output voltage of the rectifier circuit 1 returns to zero level, and then afterwards, the controlling circuit 3 closes again the switching circuit 2. By controlling open/close time of the switching circuit 2 with the controlling circuit 3, the object of controlling the amount of output voltage on the load 7 can be achieved. Meanwhile, a photo sensitive element may be added to the controlling circuit 3 optionally so as to carry out versatile photo control function.

5. Stabilizing circuit: The duty of stabilizing circuit 5 is to stabilize the voltage from the switching circuit 2 into a preferable DC voltage for the load 7.

Figure 5:
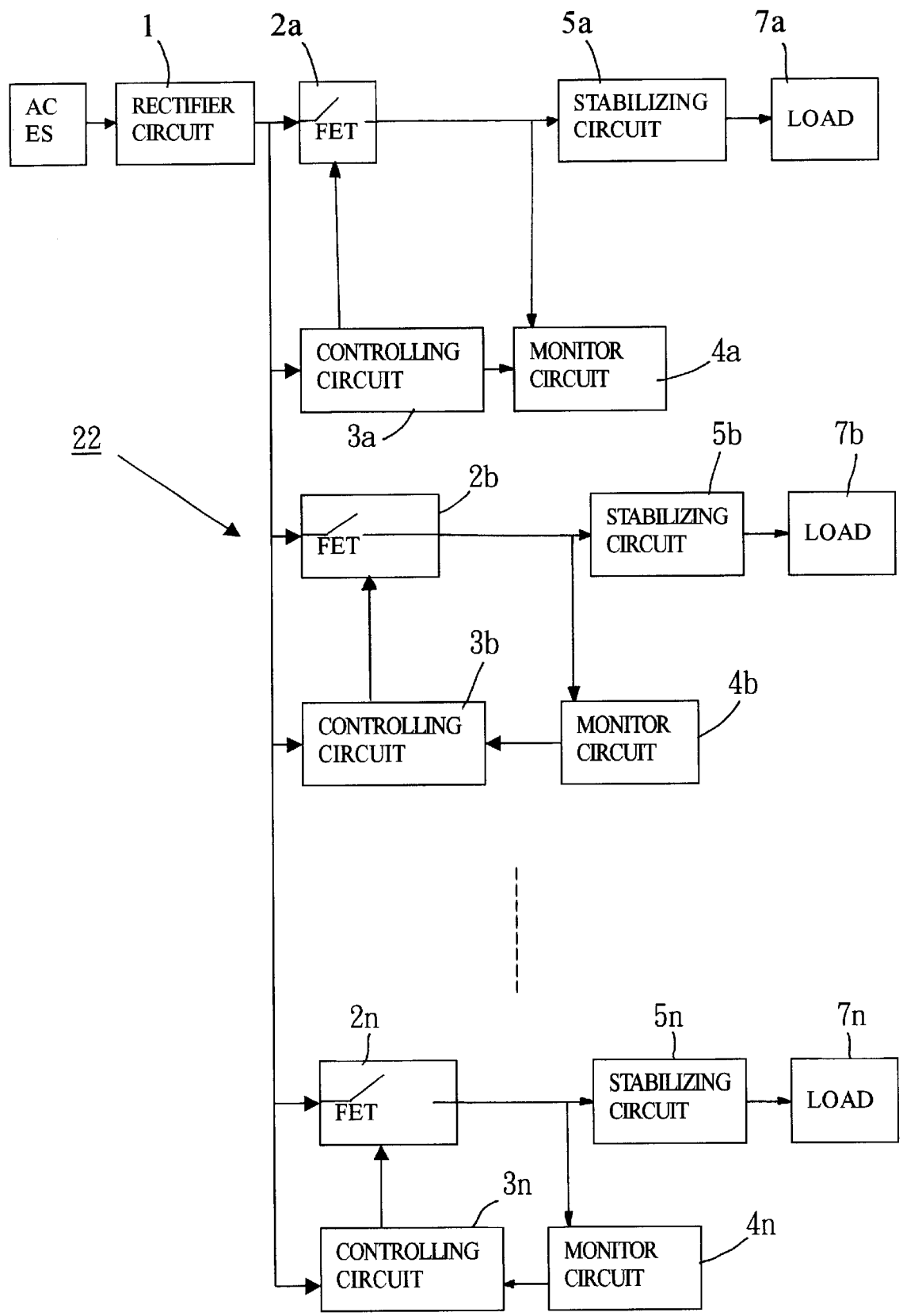
FIG. 5 is a drawing showing a plurality of load units are supplied with power from the source of the present invention.
Figure 6C:
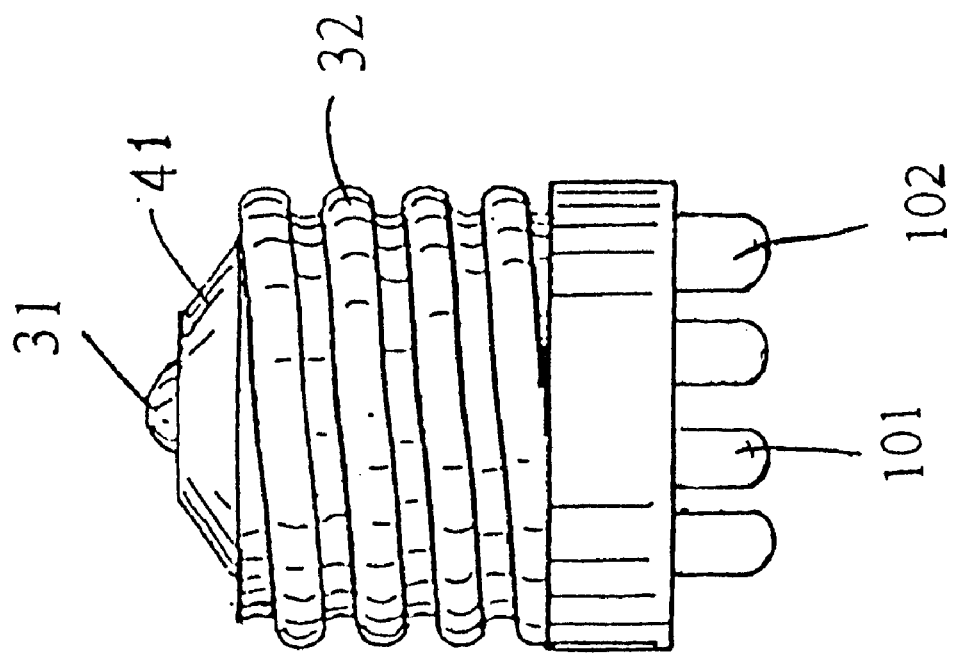
FIGS. 6A–6D are drawings illustrating how the present invention is carried out in a practical example.
Figure 6A:
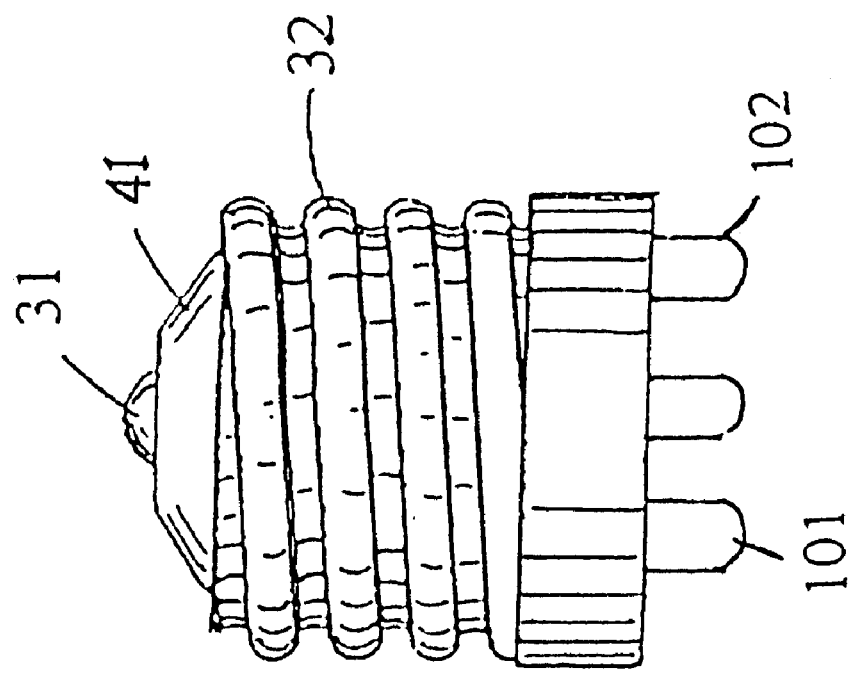
Figure 6D:
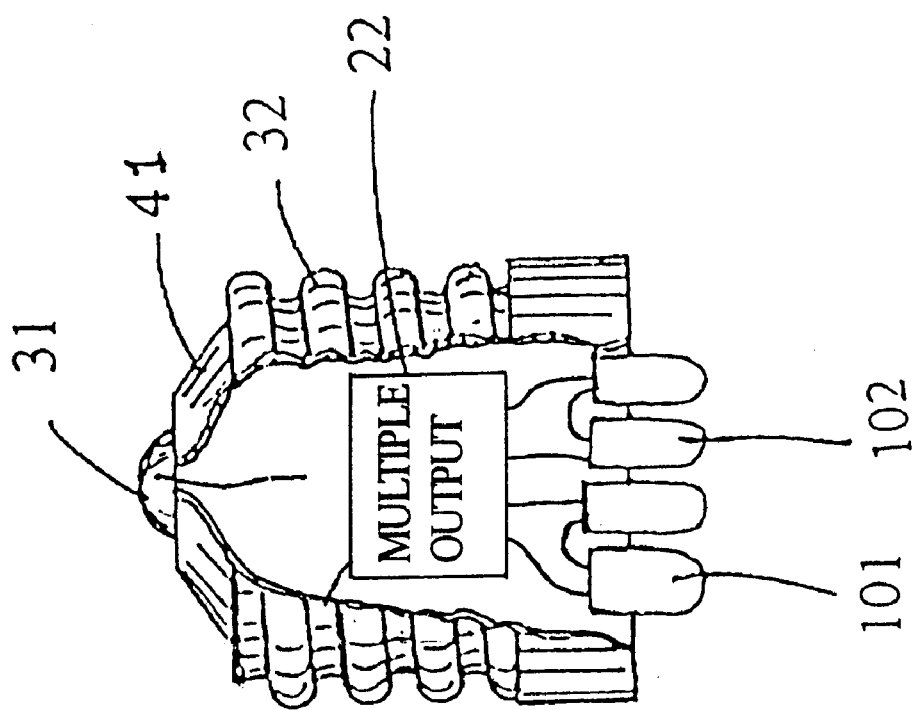
Figure 6B:
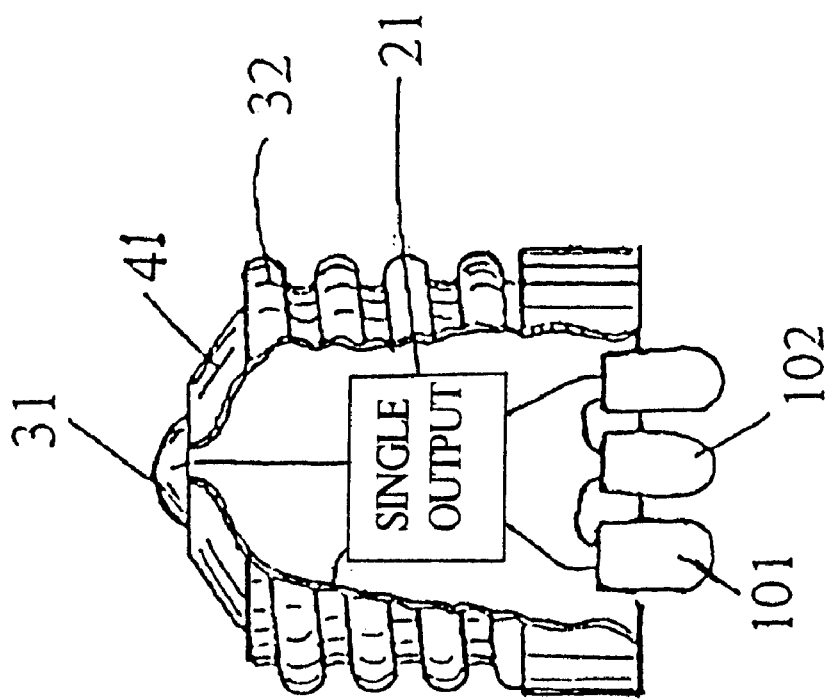

6. In case the power source is required to supply power to a plurality of load units driven by different output voltages, the circuit scheme is shown in FIG. 5. With this circuit scheme the values of output voltage required by individual load units are adjusted according to the prescribed voltage level in each monitor circuit.

Figure 3:
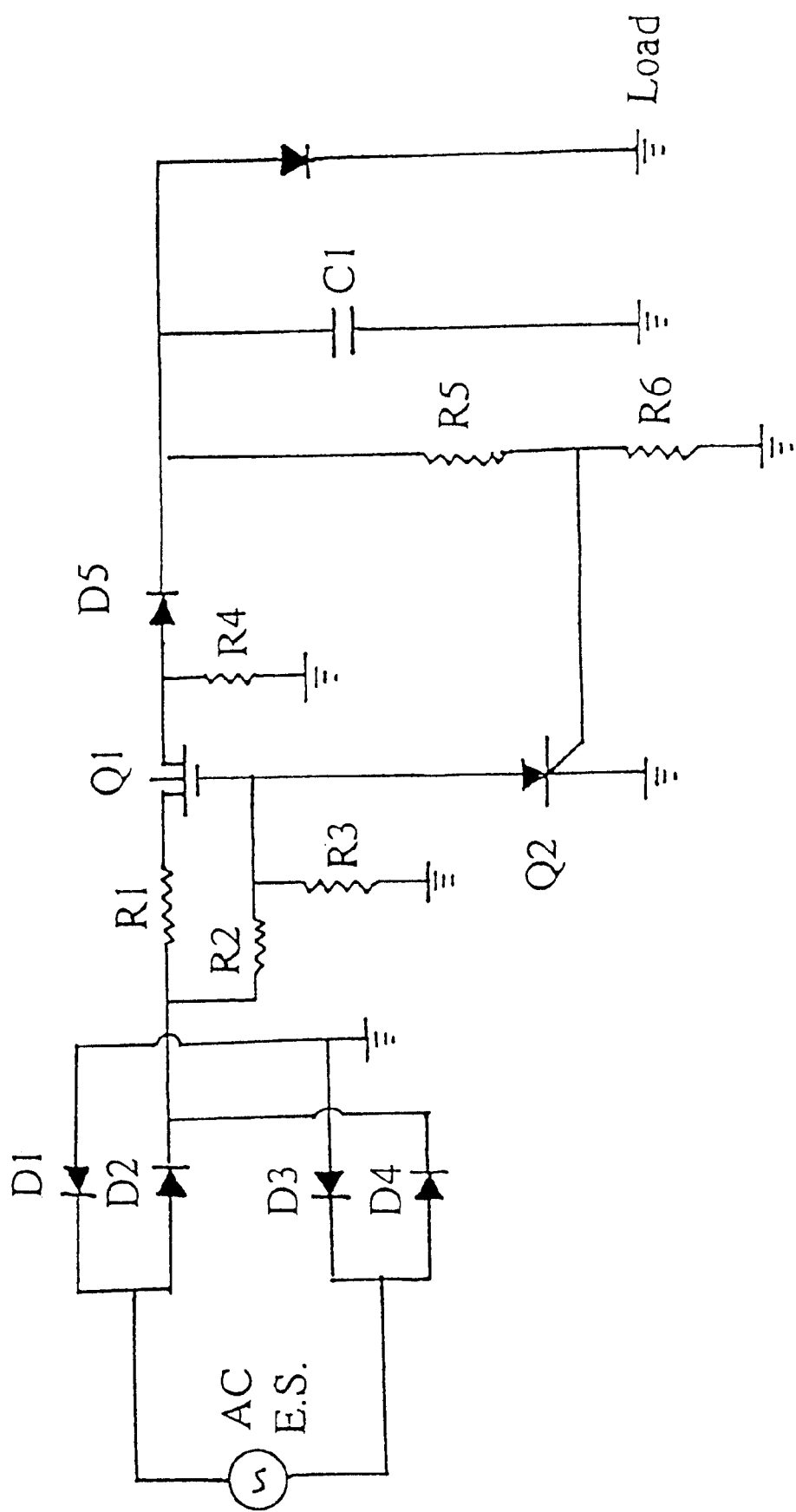
FIG. 3 is a circuit diagram in an embodiment of the present invention.

Practical circuits applied in an embodiment of the present invention is shown in FIG. 3, referring to FIGS. 2 and 3 simultaneously, wherein the elements installed in actual circuits of FIG. 3 corresponding to individual blocks in the block diagram of FIG. 2 are as follows:

(a) The rectifier circuit 1 is constituted by diodes D1, D2, D3, D4.

(b) The switching circuit 2 is constituted by resistances R1, R2, a FET Q1, diode D5.

(c) The controlling circuit 3 is constituted by resistances R2, R3, and a FET Q2.

(d) The monitor circuit 4 is constituted by resistances R5, R6.

(e) The stabilizing circuit 5 is constituted by a capacitor C1.

Figures 4A, 4B, 4C:
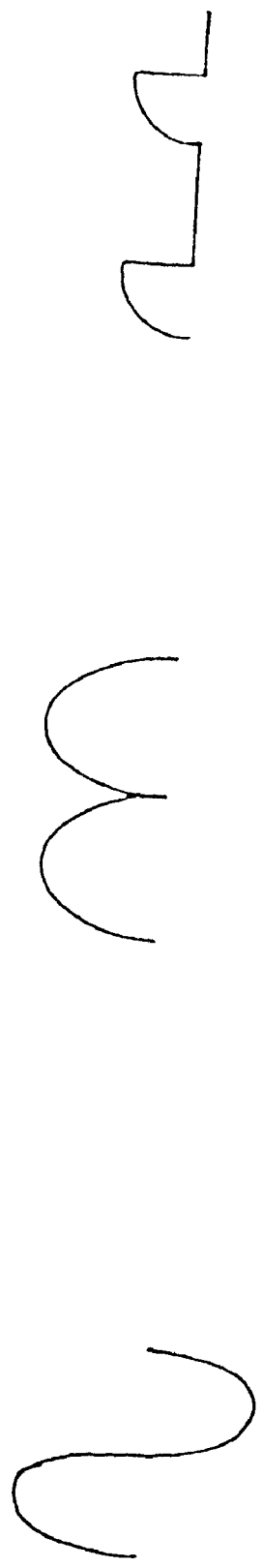
FIGS. 4A–4C are drawings showing output wave forms of the circuit in each stage in an embodiment of the present invention.

Referring to FIGS. 2 through 4C the operation of each circuit according to the present invention is described as follows:

1. The wave form of AC source voltage is shown in FIG. 4A, after having been rectified by the rectifier circuit 1 constituted by D1, D2, D3, D4, the wave form of voltage becomes as shown in FIG. 4B.

2. After rectification, the rectified voltage is sent to R2, R3 for dividing it, and this divided voltage goes to the gate electrode of Q1. Then following rising of voltage, Q1 begins to conduct the rectified voltage to the stabilizing circuit 5 via R1, Q1, D5 and finally reaches the load 7.

3. Output of the switching circuit 2 (e.g. Cathode of D5) is also sent to R5, R6 of the monitor circuit 4 for executing voltage dividing by R5 and R6 and then is sent to gate electrode of Q2 in the controlling circuit 2. Following voltage rise at cathode of diode D5, the voltage sent to gate electrode of Q2 via R5, R6 also rises to a certain value which causes Q2 to become conductive and lower the voltage at gate electrode of Q1 to zero. At this time, the rectifier voltage can not be sent to the stabilizing circuit 5 for the reason Q1 is open circuited. The wave form of the output voltage of Q1 is shown in FIG. 4C.

4. The output voltage of Q1 determined by the ratio of component voltages on R5 and R6.

FIG. 5 illustrates how a plurality of load units a, b . . . n are supplied power from the circuit of the present invention, and a practical application example is shown in FIG. 6. The load in this example may be a group of screw threaded lamp sockets each of which contains a basic circuit of the present invention therein. They can be in a single output unit 21 (FIG. 2), or in multiple output units 22 (FIG. 5) wherein lighting sources may be general vacuum bulbs, gas filled bulbs, and LEDs 101, 102. As for the socket, an ordinary socket can be employed, it also has a positive terminal 31, a negative terminal 32, and an insulation body 41 as shown in FIG. 6.

Figure 7:
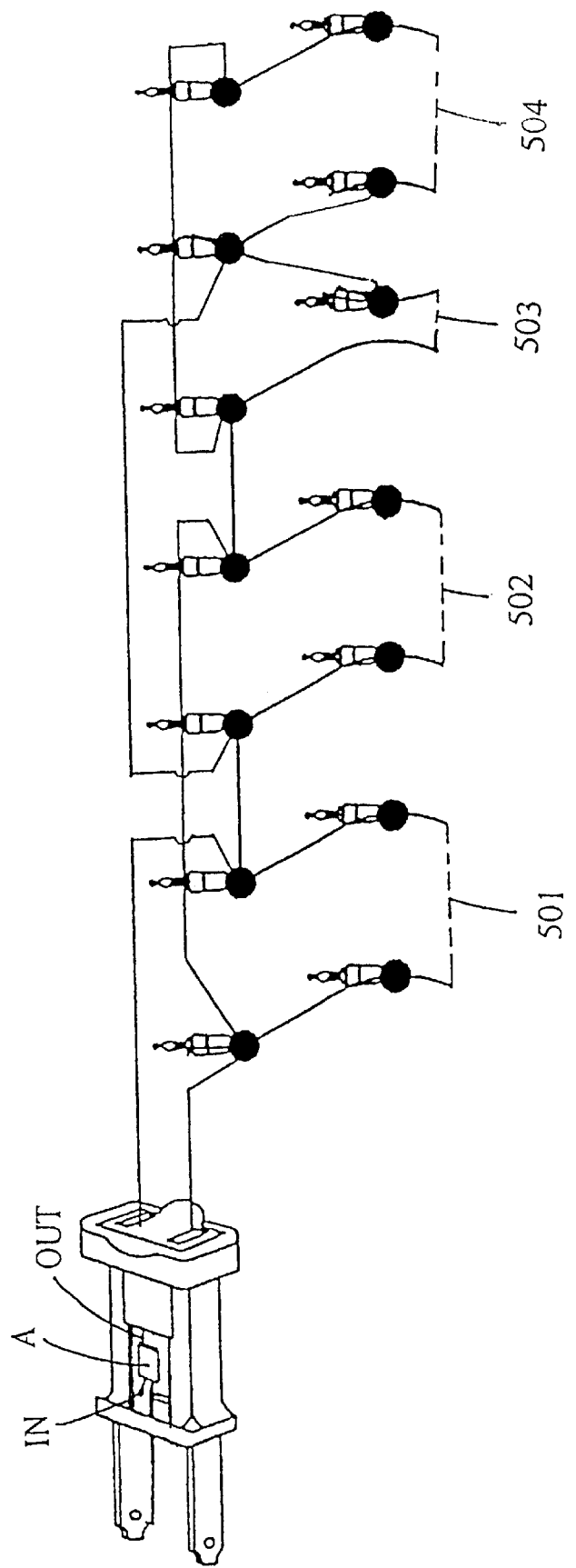
FIG. 7 is a schematic drawing of a practical example in another embodiment of the present invention.

Incidentally, as the FET constructed AC/DC power conversion circuit of the present invention A is controlled so small that it can be even accommodated in a tiny socket. Therefore, as shown in FIG. 7, the present invention A can be formed into a small chip of printed circuit beard installed in the socket so as to output DC from an output terminal "OUT" of the present invention A, and supply power to a plurality of lighting load units 501, 502, 503 . . . connected in parallel.

After having finished reading over the above description of the present invention, one may clearly understand that the innovative features involved in the present invention are by no means within the reach of any conventional techniques. But after disclosure of the present invention, those who are skilled in the art will readily perceive how to modify the invention. Therefore, the appended claims are to be construed to cover all equivalent structures which fall within the true scope and spirit of the invention.

What is claimed is:

1. A FET controlled AC/DC power conversion device powering a plurality of light emitting elements comprising:

a) a power conversion circuit adapted to be connected with an alternating current (AC) power source, the power conversion circuit including a rectifier circuit including a plurality of diodes to convert the AC from the power source into direct current (DC), a switching circuit connected to the rectifier circuit and including a plurality of resistances, a first field effect transistor (FET) and a diode to monitor an output voltage from the switching circuit, a monitor circuit connected to an output of the switching circuit and including a plurality of resistances, and a controlling circuit connected to the monitor circuit, the switching circuit and an output of the rectifier circuit, the controlling circuit including a plurality of resistances and a second field effect transistor, whereby the controlling circuit closes the switching circuit when an output voltage of the switching circuit is below a predetermined value and opens the switching circuit when the output voltage from the switching circuit exceeds the predetermined value; and b) a load comprising the plurality of light emitting elements directly connected to the power conversion circuit whereby the power conversion circuit supplies high frequency pulsating direct current (DC) to the plurality of light emitting elements.

2. The FET controlled AC/DC power conversion device of claim 1 further comprising a threaded lamp socket having the plurality of light emitting elements, wherein the power conversion circuit is located within the socket.

3. The FET controlled AC/DC power conversion device of claim 1 further comprising an electrical plug wherein the power conversion circuit is located in the electrical plug.

4. The FET controlled AC/DC power conversion device of claim 1 wherein the plurality of light emitting elements comprises a plurality of light emissive diodes (LED).

* * * * *